(12) United States Patent
Zürbes

(10) Patent No.: US 7,729,406 B2
(45) Date of Patent: Jun. 1, 2010

(54) DETECTION OF PROCESS STATE CHANGE

(75) Inventor: Stefan Zürbes, Heroldsberg (DE)

(73) Assignee: Ericsson Technology Licensing AB, Lund (SE)

(*) Notice: Subject to any disclaimer, the term of this patent is extended or adjusted under 35 U.S.C. 154(b) by 1696 days.

(21) Appl. No.: 10/893,237

(22) Filed: Jul. 19, 2004

(65) Prior Publication Data

US 2005/0055623 A1  Mar. 10, 2005

Related U.S. Application Data

(60) Provisional application No. 60/501,430, filed on Sep. 10, 2003.

(51) Int. Cl.
  *H04B 1/00* (2006.01)
(52) U.S. Cl. ............ 375/132; 375/138; 375/131; 375/227; 370/332; 370/333; 370/301; 714/776; 341/109
(58) Field of Classification Search ......... 375/130–153, 375/269, 279, 362, 355, 308, 334, 227, 228; 714/776, 780; 341/109; 708/300, 306, 5, 708/8, 21, 404; 702/199; 327/43, 64, 107, 327/37, 59; 370/332, 333, 301, 441
See application file for complete search history.

(56) References Cited

U.S. PATENT DOCUMENTS

| | | | |
|---|---|---|---|
| 4,253,093 A | 2/1981 | Johanson et al. | |
| 4,758,968 A | 7/1988 | Lord | |
| 5,506,817 A * | 4/1996 | O'Brien, Jr. | 367/135 |
| 5,727,856 A | 3/1998 | Kost et al. | |
| 5,878,096 A * | 3/1999 | Shao et al. | 375/371 |
| 6,035,033 A | 3/2000 | Von Pfeil et al. | |
| 6,188,350 B1 * | 2/2001 | Neumerkel et al. | 342/104 |
| 6,721,770 B1 * | 4/2004 | Morton et al. | 708/300 |
| 6,745,219 B1 * | 6/2004 | Zelkin | 708/490 |
| 6,859,486 B1 * | 2/2005 | Mohebbi | 375/132 |
| 6,980,926 B1 * | 12/2005 | O'Brien, Jr. | 702/179 |
| 7,230,975 B2 * | 6/2007 | Subrahmanya et al. | 375/148 |

(Continued)

FOREIGN PATENT DOCUMENTS

EP  0 061 351 A2  9/1982

(Continued)

OTHER PUBLICATIONS

PCT International Search Report, dated Jan. 11, 2005, in connection with International Application No. PCT/EP2004/009768.

(Continued)

*Primary Examiner*—David C Payne
*Assistant Examiner*—Rahel Guarino
(74) *Attorney, Agent, or Firm*—Potomac Patent Group PLLC

(57) ABSTRACT

Detection of a process state change includes, in each of a number of filters having differing time constants, generating an estimated average process state from observed samples of the process. A number of state change decisions are generated by comparing each of the number of estimated process states with a respective one of a number of threshold values. It is then decided that the process has changed state if any one or more of the state change decisions indicates that the process has changed state.

14 Claims, 2 Drawing Sheets

U.S. PATENT DOCUMENTS

| | | |
|---|---|---|
| 2002/0168034 A1 | 11/2002 | Yang et al. |
| 2004/0001429 A1* | 1/2004 | Ma et al. .................... 370/210 |
| 2004/0013168 A1* | 1/2004 | Haines et al. ............... 375/132 |

FOREIGN PATENT DOCUMENTS

| | | |
|---|---|---|
| EP | 0 182 762 A1 | 5/1986 |
| WO | WO 92/01950 | 2/1992 |
| WO | WO 92/20891 A | 11/1992 |
| WO | WO 95/08858 | 3/1995 |
| WO | WO 97/28453 | 8/1997 |
| WO | WO 01/29984 | 4/2001 |

OTHER PUBLICATIONS

PCT Written Opinion, dated Jan. 11, 2005, in connection with International Application No. PCT/EP2004/009768.

* cited by examiner

DETECTION OF PROCESS STATE CHANGE

CROSS REFERENCE TO RELATED APPLICATIONS

This application claims the benefit of U.S. Provisional Application No. 60/501,430, filed Sep. 10, 2003, which is hereby incorporated herein by reference in its entirety.

BACKGROUND

The present invention relates to detecting process state changes.

In many technologies, future actions are based on detecting whether a measurable or otherwise detectable quantity has changed from one state to another. This detection problem may be presented in cases in which the quantity is the result of a deterministic process, but it can be especially difficult when the quantity is the result of a stochastic (e.g., random) process.

For example, consider a problem that arises in connection with, for example, Bluetooth® wireless technology. Bluetooth® wireless technology utilizes a form of spread spectrum communication techniques called "frequency hopping." In accordance with conventional frequency hopping techniques, a communication device is allocated a bandwidth of the radio frequency spectrum that is wider than that which is actually necessary to communicate the information. The allocated bandwidth is divided up into a set of adjacent carrier frequencies, known to users of the communication system. To communicate the information, a transmitter selects one of the carrier frequencies, and begins transmitting. However, the transmitter rapidly switches its selection from one carrier to another, the effect of which is that the transmitter constantly "hops" from one carrier to another during the transmission. To determine which carrier frequency to hop to next, the transmitter usually relies on a predetermined pseudo-random hop sequence. To receive the transmission, the intended receiver must know which hop sequence is being used, and must synchronize its reception with this sequence, so that it always listens to the correct carrier frequency at the right time. Frequency hopping offers a number of advantages over transmission techniques that utilize the same carrier frequency continuously, including the fact that frequency hopping transmission adds very little noise to the overall allocated frequency band, thereby enabling many other wireless devices to operate within the same allocated frequency band at the same time.

Frequency hopping also offers advantages in reception, including resistance to frequency selective noise/interference. A simple way of looking at this is by considering a noise source on one or a few of the set of carrier frequencies; even if the transmitter happens to transmit on one of these "noisy" carrier frequencies, this transmission is only momentary. The transmission is likely to soon hop to a carrier frequency that is not subject to the frequency selective noise. Since most modem communication systems also employ error detection and correction mechanisms in the way the information is encoded, the receiver can usually detect and often correct any received erroneous information.

Despite frequency hopping's resistance to noise, it may be the case that one or more of the carrier frequencies are noisy for a substantial period of time. Under such circumstances, communication may become, at best, inefficient as a result of constantly having to correct erroneous received bits, or having to request and subsequently receive a retransmission of the erroneous data. One solution to this problem, Adaptive Frequency Hopping (AFH), has recently been released by the Bluetooth® Special Interest Group in a draft specification. Using this technique, the Bluetooth® radio can select a number of carrier frequencies that will be skipped during frequency hopping, thereby making them unused for radio communications. An example of an AFH scheme has been described in U.S. patent application Ser. No. 09/418,562 filed on Oct. 15, 1999 by J. C. Haartsen and published as WO01/29984.

In some embodiments of AFH, determining whether a given carrier frequency should be skipped during frequency hopping involves detecting whether some measure of quality for a given carrier has changed from an acceptable value to an unacceptable value. A measure of quality may, for example, be a measured packet error rate associated with a carrier or a set of neighboring carriers. Another example of a measure of quality is the rate of received interference power samples for a carrier or a set of neighboring carriers.

The measure of quality can be considered the output of a discrete time, binary random process that indicates the observed packet transmission successes or failures on the considered carrier or carrier set. A significant change in the measure of quality (e.g., packet error rate) is then an indication of an emerging interference on the respective carrier or carrier set. When employing AFH, this carrier or carrier set should be excluded from the set of used carriers.

Measures of quality, such as those illustrated above, are determined by monitoring the carrier or carrier set over some period of time. It is desirable, for example, to very quickly detect severe increases in packet error rate (i.e., sudden changes from a low value to a very high value), because failure to do so will noticeably degrade the communication link performance. However, it is also important to be able to reliably detect smaller changes in the measure of quality (e.g., packet error rate); a larger detection delay is permissible for these instances.

The problem described above in connection with AFH in wireless communication technology is not unique to that environment, but can instead be generalized as follows. Consider a continuous time stochastic process x(t) or a discrete time stochastic process x(k) having a time variant short time average X(t) or X(k), respectively. Detecting the process state change involves determining whether the short time average of x has increased from an initial value $X_1$ to some larger value $X_2$. This determination should be made after a reasonably short delay, and yet should be characterized by a low false alarm probability as well as a low detection failure probability.

The false alarm probability is the probability that the detection process will conclude from its observations of x that X has increased to $X_2$, although X in fact has not. The detection failure probability is the probability that the detection process will conclude from its observations of x that X still has the value $X_1$, although in fact X has increased to $X_2$.

FIG. 1 is a block diagram illustrating a conventional process state change detector. Such process state change detectors usually employ a filter 101 that generates y, a (typically unbiased) estimate of X, from the observed samples of the stochastic process x. This estimate, y, is supplied to a comparator 103 that compares y to a threshold value, u. If y(t)>u, then the comparator's output, denoted d, indicates a decision that X has increased to $X_2$, otherwise the comparator's output, d, indicates that X remained equal to (or otherwise associated with) $X_1$. Typically, $X_1 < u < X_2$ for an unbiased estimate y.

Since x is a non-deterministic process with a non-zero variance, y will also have some (smaller) variance. Consequently, there is usually a non-zero false alarm probability Prob{y>u|X=$X_1$}, and a non-zero detection failure probability Prob{y<u|X=$X_2$}. More accurately, considering continuous time processes, the false alarm probability, $p_{FA}$, is the probability that there exists at least one time $t_1$<T in the past such that y($t_1$)>u, although X(t)=$X_1$ for all t<T. Here, T is the current time. Given a step change in X, the decision failure probability, $p_{DF}$, is the probability that y(t)<u for all t<T, although X(t)=$X_2$ for all t in a certain interval in the past. If one considers a more complicated behavior of X, such as X(t)=$X_1$ for all t<$t_0$, X(t)=$X_2$ for $t_0 \leq$ t<$t_1$, and X(t)=$X_1$ for t>$t_1$, then y(t)<u for all t would be considered a detection failure if the time period ($t_1-t_0$) of the increase is larger than the tolerated detection delay. Otherwise, the described behavior of X could be considered to be transient, and non-detection of this transient would not be considered a failure of the detector. Equivalent definitions of false alarm probability and detection failure probability hold if x is a discrete time process.

For a given variance of x, there is a basic interdependency between the detection delay of the process state change detector, the effective averaging period of the filter, the difference between $X_1$ and $X_2$, and the false alarm and detection failure probabilities under ideal selection of the threshold value, u.

For a given variance of x, and certain requirements on the decision error probabilities $p_{FA}$ and $p_{DF}$, the variance of y must be smaller, the smaller the difference between $X_1$ and $X_2$. This means in turn that a smaller difference between $X_1$ and $X_2$ requires a larger effective averaging window of the filter, which in turn increases the average detection delay of the process state change detector.

This causes problems in many applications because the value $X_2$ to which X may change in the future is not known a priori. Instead, the process state change detector is required to reliably detect changes to arbitrary values $X_2$ above a certain minimum $X_{2\_min}$, but has to maintain low decision error probabilities $p_{FA}$ and $p_{DF}$ in all cases. As a result, the filter has to be designed for the limiting case $X_2=X_{2\_min}$, since this case causes the largest decision error probabilities. But designing for the limiting case means choosing the averaging window to be accordingly large, which in turn increases the decision delay even in cases in which the actual $X_2$ is well above $X_{2\_min}$.

It is therefore desired to have process state change detectors and methods that improve upon the performance of conventional process state change detectors.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that detect a state change in a process. In one aspect, such detection includes, in each of a plurality of filters having differing time constants, generating an estimated average process state from observed samples of the process. A plurality of state change decisions are generated by comparing each of the plurality of estimated process states with a respective one of a plurality of threshold values. It is then decided that the process has changed state if any one or more of the state change decisions indicates that the process has changed state.

In another aspect, the process is a stochastic process.

In yet another aspect, the observed samples of the process are measures of quality for a given carrier or set of neighboring carriers in a telecommunications system. For example, the measures of quality for the given carrier may be measures of packet error rate associated with the given carrier or set of neighboring carriers. In another (alternative) example, the measures of quality for the given carrier may be measures of received interference power samples associated with the given carrier or set of neighboring carriers. In yet other (alternative) examples, a combination of measures packet error rate and measures of received interference may be used as the measures of quality.

In still other aspects, the various process state change detection methods and apparatuses described herein may be applied to determine whether a carrier frequency should be skipped in an adaptive frequency hopping telecommunications system. In such systems, the transmission quality of the carrier frequency is measured over time. It is then determined whether the quality of the carrier frequency has changed from an acceptable level to an unacceptable level; and it is decided to skip the carrier frequency if the quality of the carrier frequency has changed from the acceptable level to the unacceptable level.

BRIEF DESCRIPTION OF THE DRAWINGS

The objects and advantages of the invention will be understood by reading the following detailed description in conjunction with the drawings in which.

DETAILED DESCRIPTION

Figure 1:
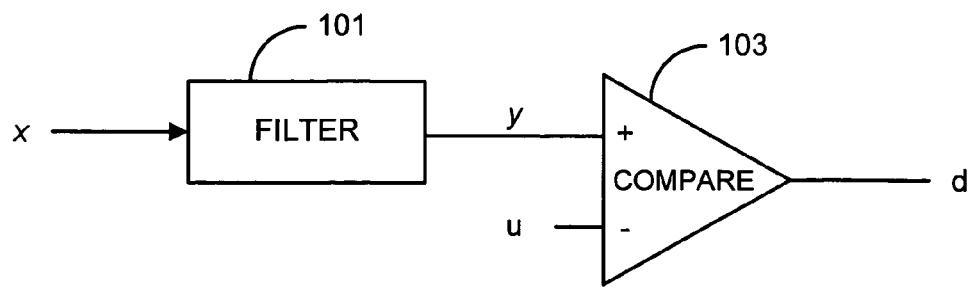
FIG. 1 is a block diagram of a conventional process state change detector.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function, and/or analog circuits such as, but not limited to, analog filters and comparators), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In accordance with an aspect of the invention, detecting a process state change involves invoking a plurality of filters with differing time constants. The output from each of the filters is compared with a corresponding one of a plurality of threshold values. If any of these comparisons detects a change in state, then the output of the process state change detection also indicates a change in state; otherwise, no change in state is indicated. Such an arrangement provides both fast detection of severe changes of X, and also reliable detection of small changes of X (but at a correspondingly slower speed).

These and other aspects will now be described in greater detail with reference to an exemplary embodiment illustrated in FIG. 2. In the exemplary embodiment, the observed samples of the stochastic process x are supplied to each of a number, N, of filters 201-1 . . . 201-N. Each filter 201-n (where $1 \leq n \leq N$) generates an output, $y_n$, which is a (typically unbiased) estimate of X, from the observed samples of the stochastic process x. Each of the estimates, $y_1 \ldots y_N$, is supplied to a corresponding one of N comparators 203 that compares each value $y_n$ to a corresponding threshold value, $u_n$. If $y_n(t) > u_n$, then the comparator's output, denoted $d_n$, indicates a decision that X has increased to $X_2$, otherwise the comparator's output, $d_n$, indicates that X remained equal to (or otherwise associated with) $X_1$. Typically, $X_1 < u_n < X_2$ for an unbiased estimate $y_n$.

Each of the decisions, $d_1 \ldots d_N$, is supplied to a corresponding one of N inputs of a logical OR function 205, whose output d is asserted if and only if at least one of the inputs $d_1 \ldots d_N$ is asserted. The output, d, of the logical OR function 205 represents the final decision of the exemplary process state change detector.

In an aspect of the invention, each of the filters 201-1 . . . 201-N preferably has a different time constant. And, as indicated above, a change of X from $X_1$ to $X_2 > X_{2\_min}$ is decided if any of the comparators 203-1 . . . 203-N detects a change. Assume that a first filter 201-1 is the filter having the largest averaging window, that an N-th filter 201-N is the filter having the smallest averaging window, and that the remaining filters 201-2 . . . 201-N–1 have various averaging windows whose sizes are in between the largest and smallest. For each of the filters 201-1 . . . 201-N, the corresponding threshold values $u_1 \ldots u_N$ are set to a level that will result in a low and/or otherwise acceptable false alarm probability $p_{FA}$. For example, the N-th threshold value, $u_N$, should be set to a level that is large enough to cause the resultant false alarm probability $p_{FA}$ to be low even though the variance of $y_N$ is large (due to the small averaging window size). That is, using a larger threshold value $u_N$ (compared to the other threshold values $u_1 \ldots u_{N-1}$) compensates for the larger variance of $y_N$ (compared to the variance of the other estimates $y_1 \ldots y_{N-1}$), so that the last comparator 203-N maintains a low false alarm probability $p_{FA}$. Additionally, the relatively large value of $u_N$ coupled with the relatively small averaging window of the N-th filter 201-N means that severe increases of X will be very quickly detected and indicated in the decision $d_N$ without sacrificing a low detection failure probability despite the existence of small increases of X.

At the other end of the scale, the smallest increase in X (e.g., from $X_1$ to $X_2 = X_{2\_min}$) is reliably detected by the first filter 201-1 (which has the largest averaging window) in combination with the lowest threshold value $u_1$, but this detection requires a correspondingly larger detection delay. The filters 201-2 . . . 201-N–1 having averaging windows in between these two extremes, in conjunction with corresponding threshold values $u_2 \ldots u_{N-1}$, are used to detect moderate increases of X to values $X_2 > X_{2min}$. The detection delays associated with these various filter paths have a corresponding range in between the longest delay (associated with the first filter 201-1) and the shortest delay (associated with the N-th filter 201-N).

Figure 3:
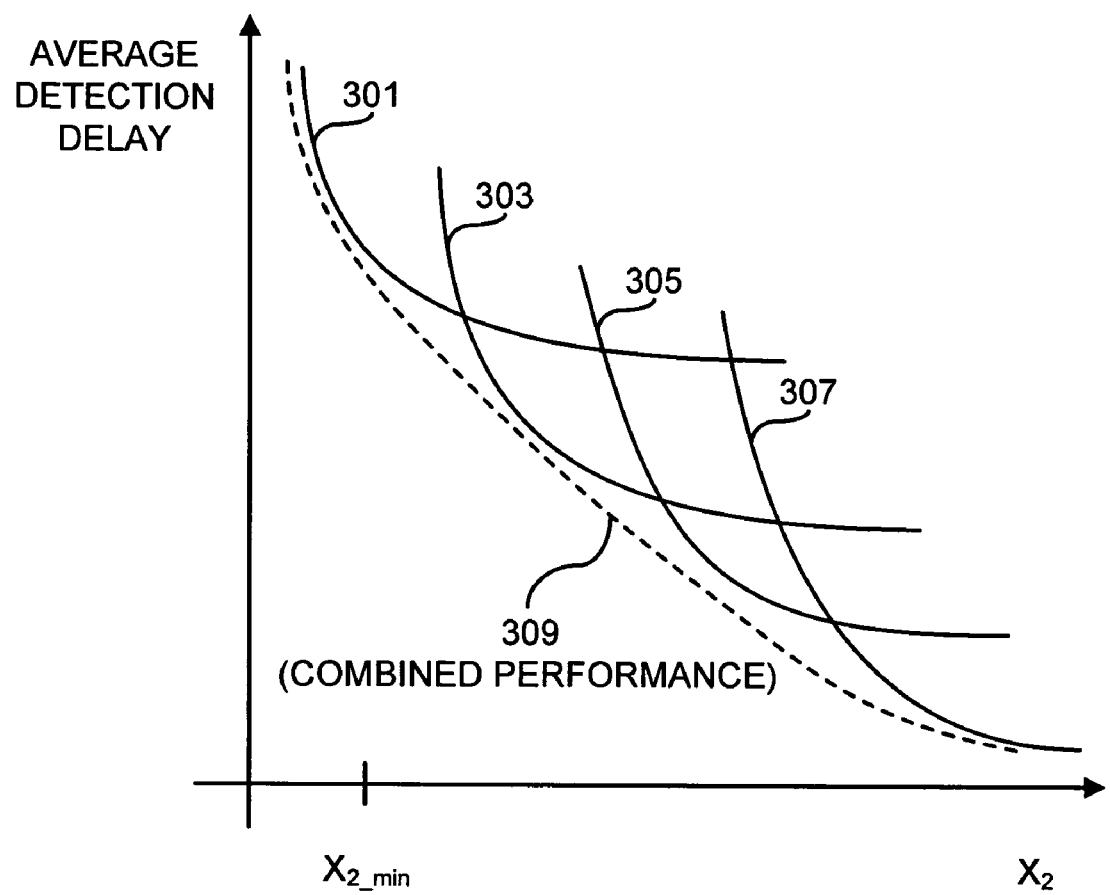
FIG. 3 is a set of graphs showing, for each of four filters, the filter's average detection delay as a function of the short time average $X_2$ after a process state increase, and the average delay performance of an exemplary embodiment.

To appreciate the overall performance of such a system, consider an exemplary process state change detector comprising four filters, $F_1 \ldots F_4$. FIG. 3 is a set of graphs 301, 303, 305, 307 showing, for each of the four filters $F_1 \ldots F_4$, the filter's average detection delay as a function of the short time average $X_2$ of a stochastic process after the increase. Because the observed samples of the stochastic process x have values that can be described by a distribution function, detecting a change in the short time average $X_2$ is equivalent to detecting a shift in the distribution function (i.e., detecting that the observed samples are now clustered around a different value). Consequently, for each of the four filters, $F_1 \ldots F_4$, detection occurs more rapidly for larger changes in $X_2$ than for small changes; this characteristic is illustrated by each of the four graphs 301, 303, 305, and 307.

However, the average detection delays of the four filters $F_1 \ldots F_4$ are not equal to one another because of their different averaging window lengths. Rather, it can be seen from the four graphs 301, 303, 305, 307 that for sufficiently large values of $X_2$, the fourth filter $F_4$ will exhibit the shortest average detection delay; that for a range of just lower values, the third filter $F_3$ will exhibit the shortest average detection delay, and so on until detection of the lowest values of $X_2$ can be performed most quickly by the first filter $F_1$. This overall performance can be accomplished by setting the four threshold values $u_1 \ldots u_4$ to suitable values that will achieve a desired false alarm probabilities, $p_{FA}$, for the entire detector. These values are therefore based on averaging window size of each of the filters $F_n$. The curve 309 (illustrated by the dotted line) illustrates an approximation of the overall performance that can be achieved by settings of this nature.

The following guidance is offered with respect to how to select the number of filters, and/or how to decide the sizes of the averaging windows of all of the filters. For a given stochastic process and set of detection performance requirements, do the following: For different filter parameters (e.g., averaging window sizes), determine the optimal threshold value u and the performance of a conventional change detector. The performance results for the investigated filter parameter settings are drawn in a figure, similar to FIG. 3. The detection performance requirements for the complete detector, like $X_{2\_min}$ and the maximum detection delay for large $X_2$ limit the relevant area in the figure, and indicate how many different filters are needed, and which parameters they should have. For example, in FIG. 3, the curves 301, 303, 305, and 307 of the individual filters are sufficiently different in the sense that they cover sufficiently different regions of the area in the figure. A certain filter can be removed from the combined change detector if its contribution to the overall covered area in a figure (like FIG. 3) is not relevant. Similarly, another filter should be added if the given set does not provide sufficient coverage for a desired coverage area.

The invention has been described with reference to a particular embodiment. However, it will be readily apparent to those skilled in the art that it is possible to embody the invention in specific forms other than those of the preferred embodiment described above.

Figure 2:
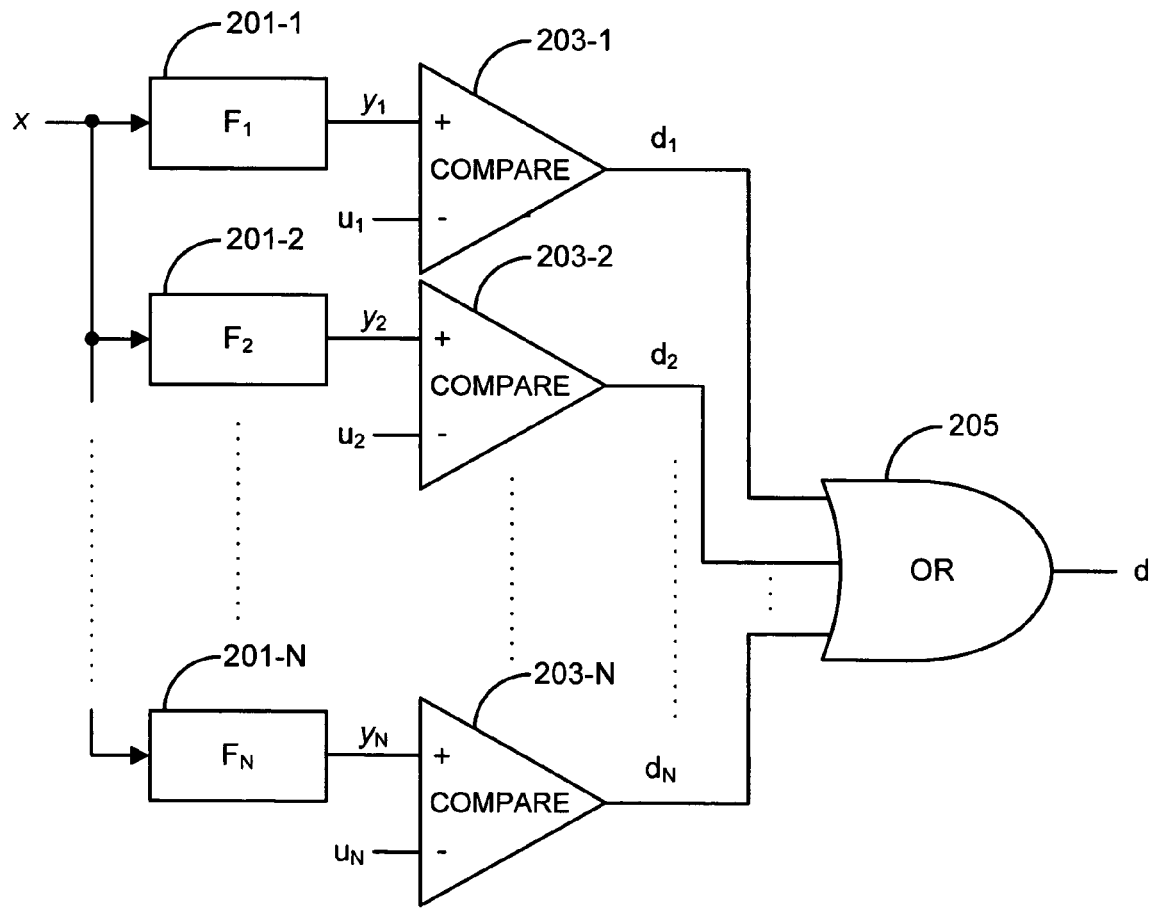
FIG. 2 is a functional block diagram of an exemplary process state change detector in accordance with an aspect of the invention.

For example, the exemplary embodiment depicted in FIG. 2 employs a logical OR function to determine whether any of the decisions $d_1 \ldots d_N$ is being asserted. In alternative embodiments, however any equivalent logic could be substituted therefor including, but limited to, the use of negative logic arrangements (e.g., including NOR or NAND arrangements) or logic that determines whether the number of decisions $d_1 \ldots d_N$ presently being asserted is greater than or equal to one.

Furthermore, in many embodiments the observed samples of the process upon which a state change detection is based are measures of quality for a given carrier or set of neighboring carriers in a telecommunications system. In some of these embodiments, the measures of quality for the given carrier may be measures of packet error rate associated with the given carrier and/or set of neighboring carriers. In other (alternative) embodiments, the measures of quality for the given carrier are measures of received interference power samples associated with the given carrier and/or set of neighboring carriers. In still other (alternative) embodiments the measures of quality for the given carrier are formed from a combination of measures of packet error rate associated with the given carrier and/or set of neighboring carriers and measures of received interference power samples associated with the given carrier or set of neighboring carriers.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of determining whether a carrier frequency should be skipped in an adaptive frequency hopping telecommunications system, the method comprising:
    measuring a transmission quality of the carrier frequency over time;
    determining whether the transmission quality of the carrier frequency has changed from an acceptable level to an unacceptable level; and
    deciding to skip the carrier frequency if the transmission quality of the carrier frequency has changed from the acceptable level to the unacceptable level,
    wherein determining whether the transmission quality of the carrier frequency has changed from the acceptable level to the unacceptable level comprises:
        in each of a plurality of filters having differing time constants, generating an estimated average measure of quality from the measurements of transmission quality of the carrier frequency;
        generating a plurality of state change decisions by comparing each of the plurality of estimated average measures of quality with a respective one of a plurality of threshold values; and
        deciding that the transmission quality of the carrier frequency has changed from the acceptable level to the unacceptable level if any one or more of the state change decisions indicates that the transmission quality of the carrier frequency has changed from the acceptable level to the unacceptable level.

2. The method of claim 1, wherein the measures of transmission quality for the carrier frequency are measures of packet error rate associated with the carrier frequency.

3. The method of claim 1, wherein the measures of transmission quality for the carrier frequency are measures of packet error rate associated with the carrier frequency and a set of neighboring carriers.

4. The method of claim 1, wherein the measures of transmission quality for the carrier frequency are measures of received interference power samples associated with the carrier frequency.

5. The method of claim 1, wherein the measures of transmission quality for the carrier frequency are measures of received interference power samples associated with the carrier frequency and a set of neighboring carrier frequencies.

6. The method of claim 1, wherein the measures of transmission quality for the given carrier are formed from a combination of measures of packet error rate associated with the given carrier and measures of received interference power samples associated with the given carrier.

7. The method of claim 1, wherein the measures of transmission quality for the given carrier are formed from a combination of measures of packet error rate associated with the given carrier and a set of neighboring carriers and measures of received interference power samples associated with the given carrier and a set of neighboring carriers.

8. An apparatus that determines whether a carrier frequency should be skipped in an adaptive frequency hopping telecommunications system, the apparatus comprising:
    logic that measures a transmission quality of the carrier frequency over time;
    logic that determines whether the transmission quality of the carrier frequency has changed from an acceptable level to an unacceptable level; and
    logic that decides to skip the carrier frequency if the transmission quality of the carrier frequency has changed from the acceptable level to the unacceptable level,
    wherein the logic that determines whether the transmission quality of the carrier frequency has changed from the acceptable level to the unacceptable level comprises:
        a plurality of filters having differing time constants, wherein each of the filters generates an estimated average measure of quality from the measurements of transmission quality of the carrier frequency;
        logic that generates a plurality of state change decisions by comparing each of the plurality of estimated average measures of quality with a respective one of a plurality of threshold values; and
        final decision logic that decides that the transmission quality of the carrier frequency has changed from the acceptable level to the unacceptable level if any one or more of the state change decisions indicates that the transmission quality of the carrier frequency has changed from the acceptable level to the unacceptable level.

9. The apparatus of claim 8, wherein the measures of transmission quality for the carrier frequency are measures of packet error rate associated with the carrier frequency.

10. The apparatus of claim 8, wherein the measures of transmission quality for the carrier frequency are measures of packet error rate associated with the carrier frequency and a set of neighboring carriers.

11. The apparatus of claim 8, wherein the measures of transmission quality for the carrier frequency are measures of received interference power samples associated with the carrier frequency.

12. The apparatus of claim 8, wherein the measures of transmission quality for the carrier frequency are measures of received interference power samples associated with the carrier frequency and a set of neighboring carrier frequencies.

13. The apparatus of claim 8, wherein the measures of transmission quality for the given carrier are formed from a combination of measures of packet error rate associated with the given carrier and measures of received interference power samples associated with the given carrier.

14. The apparatus of claim 8, wherein the measures of transmission quality for the given carrier are formed from a combination of measures of packet error rate associated with the given carrier and a set of neighboring carriers and measures of received interference power samples associated with the given carrier and a set of neighboring carriers.

* * * * *

UNITED STATES PATENT AND TRADEMARK OFFICE
CERTIFICATE OF CORRECTION

PATENT NO. : 7,729,406 B2  Page 1 of 1
APPLICATION NO. : 10/893237
DATED : June 1, 2010
INVENTOR(S) : Zurbes It is certified that error appears in the above-identified patent and that said Letters Patent is hereby corrected as shown below:

In Column 1, Line 56, delete "modem" and insert -- modern --, therefor.

Signed and Sealed this

Third Day of August, 2010

David J. Kappos
*Director of the United States Patent and Trademark Office*